Figure 3:
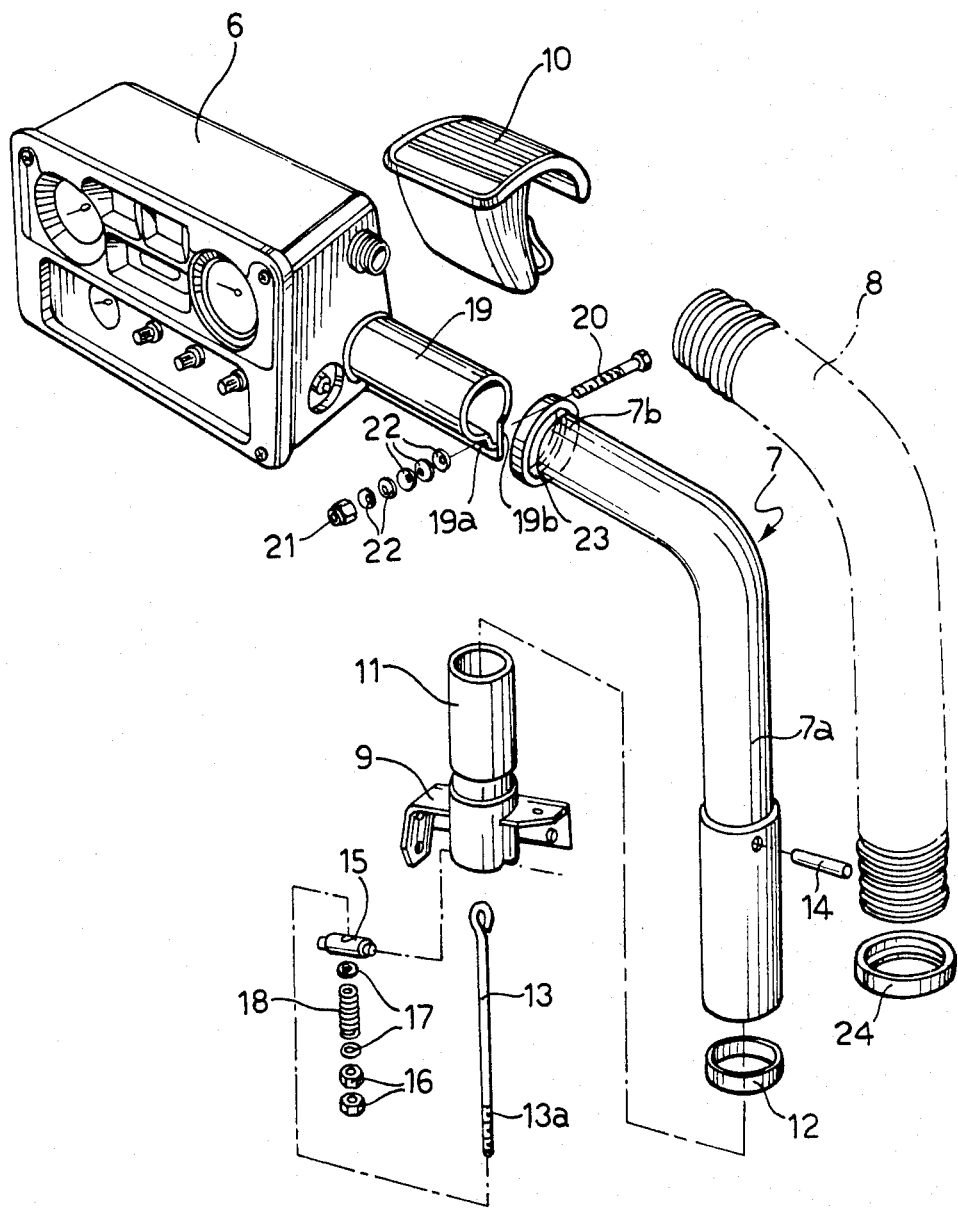

United States Patent [19]

Raineri

[11] Patent Number: 4,724,918

[45] Date of Patent: Feb. 16, 1988

[54] AUXILIARY INSTRUMENT PANEL FOR CABS OF MACHINES, PARTICULARLY AGRICULTURAL MACHINES

[75] Inventor: Giuseppe Raineri, Bassano del Grappa, Italy

[73] Assignee: Pietro Laverda S.p.A., Breganze, Italy

[21] Appl. No.: 4,945

[22] Filed: Jan. 20, 1987

[30] Foreign Application Priority Data

Jan. 20, 1986 [IT]  Italy ............................. 52869/86[U]

[51] Int. Cl.⁴ ............................................ B60K 37/06
[52] U.S. Cl. ....................................... 180/90; 296/70
[58] Field of Search ................. 180/90, 78; 296/70–74

[56] References Cited

U.S. PATENT DOCUMENTS

| | | | |
|---|---|---|---|
| 2,976,947 | 3/1961 | Cruthis et al. | 180/90 |
| 3,448,821 | 6/1969 | McGuire | 180/90 |
| 4,372,410 | 2/1983 | Loken et al. | 180/90 |
| 4,471,848 | 9/1984 | Skytoen | 180/90 |

Primary Examiner—Richard A. Bertsch
Attorney, Agent, or Firm—Sughrue, Mion, Zinn, Macpeak and Seas

[57] ABSTRACT

An auxiliary instrument panel for cabs of machines, particularly agricultural machines, comprises a panel containing control instruments, and a tubular support arm for the panel. The support arm is essentially L-shaped and has a first protion intended to be supported in a vertical position by the structure of the cab so as to be rotatable about its own axis, and a second portion which supports the panel for rotation about the axis of the second portion.

8 Claims, 5 Drawing Figures

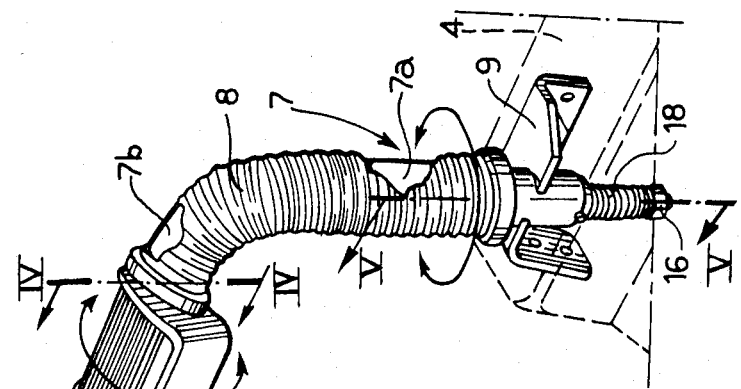
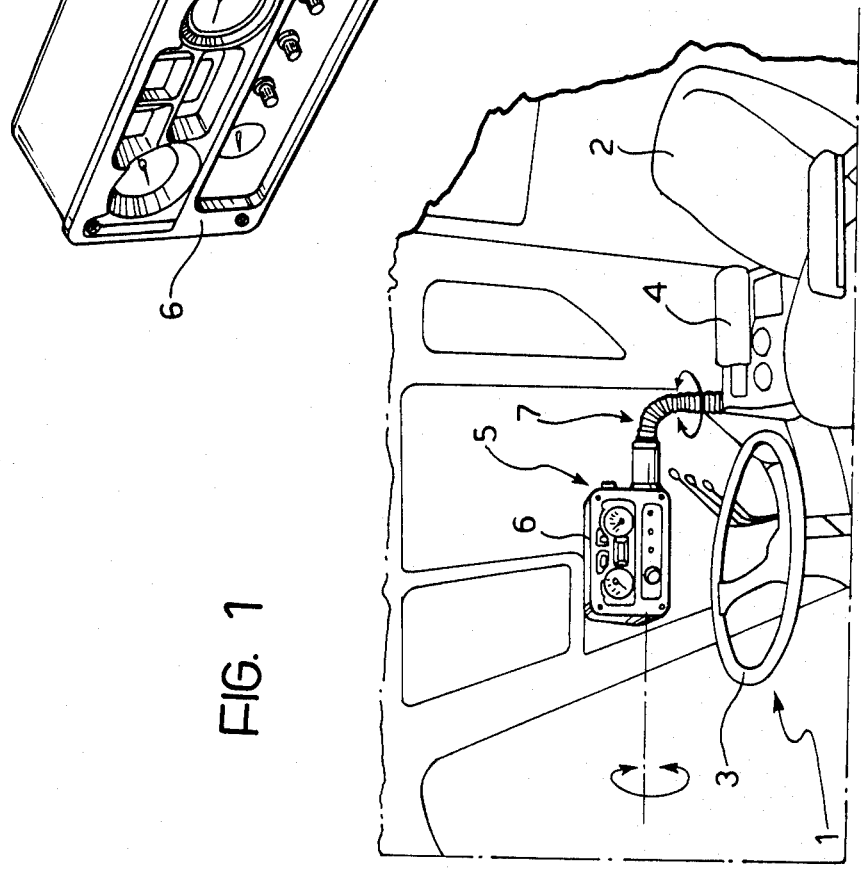

AUXILIARY INSTRUMENT PANEL FOR CABS OF MACHINES, PARTICULARLY AGRICULTURAL MACHINES

The present invention relates to machines, particularly agricultural machines.

The object of the invention is to provide an auxiliary instrument panel for a cab of a machine of the type specified above, which allows convenient and easy reading by the operator without, at the same time, limiting the operator's view of the operating equipment in front of the machine.

The auxiliary instrument panel of the invention is characterised in that it comprises:
a panel containing control instruments,
a tubular support arm for the panel, which is essentially L-shaped and has a first portion intended to be supported in a vertical position by the structure of the cab so as to be rotatable about the axis of the first portion, and a second portion which supports the panel for rotation about the axis of the second portion.

By virtue of these characteristics, the auxiliary instrument panel according to the invention may be located by the operator in the position of easiest and most immediate reading. At the same time, the particular conformation and arrangement of the support arm of the instrument panel ensures full visibility of the operating equipment in front of the machine.

Figure 5:
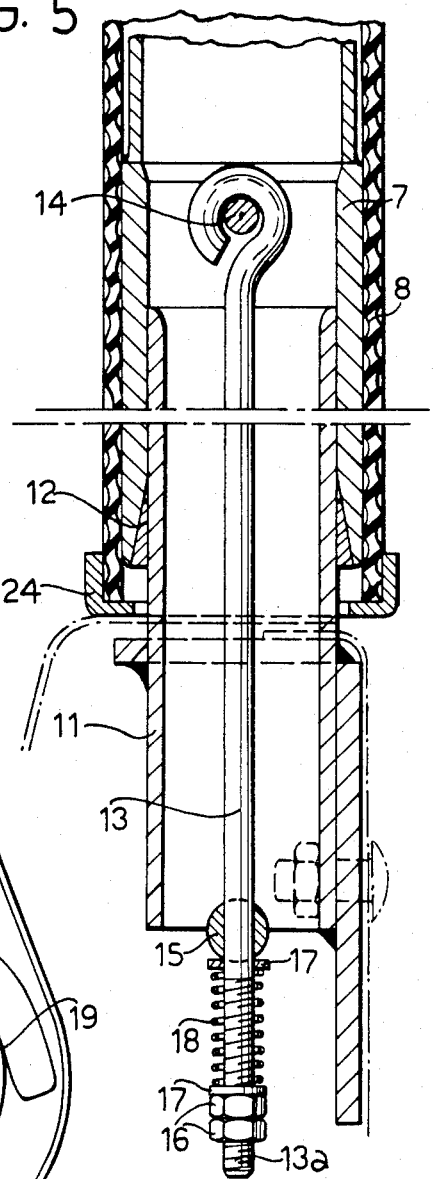
Figure 4:
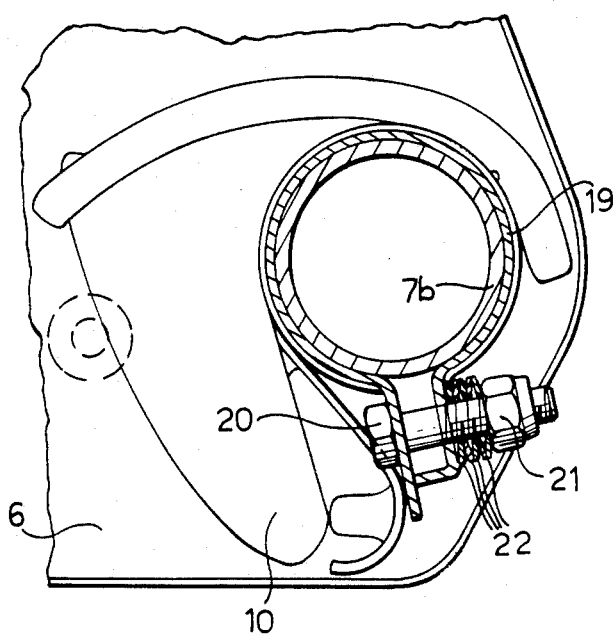

Further characteristics and advantages of the present invention will become apparent from the description which follows with reference to the appended drawings, provided purely by way of non-limiting example, in which:

FIG. 1 is a partial perspective view of a cab of an agricultural machine having an instrument panel according to the invention, FIG. 2 is a perspective view of the instrument panel of FIG. 1 on an enlarged scale, FIG. 3 is an exploded perspective view of the instrument panel of the invention, FIG. 4 is a section taken on the line IV—IV of FIG. 2, and FIG. 5 is a section taken on the line V—V of FIG. 2.

With reference to the drawings, a cab of an agricultural machine is generally indicated 1 and within it can be seen a seat 2 for the driver, a steering wheel 3, a conventional instrument panel 4, and an auxiliary instrument panel 5 constituting the subject of the present invention.

This auxiliary instrument panel, as can be seen most clearly from FIG. 2, comprises a panel 6 containing control instruments and a tubular support arm 7 for the panel 6, which is L-shaped and covered by a corrugated protective tube 8 made, in the example illustrated, from rubber.

The tubular support arm has a first portion 7a intended to be supported in a vertical position by a member 9 fixed to the structure of the conventional instrument panel 4, so as to be rotatable about the axis of the portion 7a; the tubular arm also has a second portion 7b which supports the panel 6 for rotation about the axis of the second portion 7b.

An ashtray 10 fixed removably to the structure is also seen in the Figure.

The details of construction and assembly of the auxiliary instrument panel will be seen more clearly from the exploded view of FIG. 3 and the sections of FIGS. 4 and 5 in which the same parts are indicated by the same numerals as used in the previous Figures.

The support of the tubular arm on the element 9 intended to be fixed to the structure of the conventional instrument panel 4 is achieved as follows. An auxiliary tubular member 10 is mounted vertically on the member 9 and carries, on its upper outer surface, a ring with a conical bearing surface 12 for the support of the lower end of the portion 7b of the tubular arm 7.

A rod 13 is located within the tubular member 11 and hooked at its upper end to a first transverse pin 14 carried by the tubular arm 7. The rod 13 had a lower threaded end 13a. The rod 13 is inserted in a second transverse pin 15 carried by the tubular member 11 and is fixed to it by the screwing of nuts 16 onto the threaded end 13a of the rod 13. Between the second transverse pin 15 and the nuts 16 are a helical spring 18 and a washer 17. Thus, the lower end of the portion 7b of the tubular arm 7 is kept pressed against the conical bearing surface 12. The panel 6, however, is fixed to the portion 7a of the tubular arm 7 in the following manner. The panel 6 has a tubular appendage 19 which is rotatably mounted on the free end of the portion 7a of the tubular arm 7. This tubular appendage has an open section with adjacent longitudinal flanges 19a, 19b clamped against each other by a bolt constituted by a screw 20 which passes transversely through the longitudinal flanges 19a, 19b and a nut 21 which is screwed onto the screw 20. A series of cup springs 22 is interposed between the nut 21 and the flange 19a. An ashtray 10 is fixed releasably to the tubular appendage 19.

Finally, the tubular arm 7 is covered, as stated, by a corrugated protective tube 8 retained at its two ends by rings 23 and 24.

Naturally, the principal of the invention remaining the same, the constructional details and forms of embodiment may be varied widely with respect to that described and illustrated purely by way of example, without thereby departing from the scope of the present invention.

What is claimed is:

1. An auxiliary instrument panel for cabs of machines, particularly but not exclusively agricultural machines, wherein it comprises a panel containing control instruments, and a tubular support arm for the panel, the support arm being essentially L-shaped and having a first portion intended to be supported in a vertical position by the structure of the cab so as to be rotatable about the axis of the first portion, and a second portion which supports the panel for rotation about the axis of the second portion, wherein an auxiliary tubular member is provided for rotatably supporting the lower end of the first vertical portion of the tubular arm, the auxiliary tubular member being intended for fixing in a vertical position on the structure of the cab and being provided on its outer surface with a bearing surface for supporting the lower end of the first portion of the tubular arm, and wherein the instrument panel also has means for fixing the tubular arm to the auxiliary tubular member and for keeping the lower end pressed against the bearing surface.

2. An instrument panel according to claim 1, wherein the bearing surface is a conical surface.

3. An instrument panel according to claim 1, the fixing means comprise an elongate member located in the auxiliary tubular member and having a hooked upper end and a threaded lower end, a first transverse pin carried by the tubular arm and engaged by the hooked end of the tubular member, a second transverse pin carried by the auxiliary tubular member and traversed by the elongate member, a nut screwed onto the lower threaded end of the elongate member, and a spring interposed between the second transverse pin and the nut.

4. An instrument panel according to claim 1, wherein the panel has a tubular appendage rotatably mounted on the free end of the second portion of the tubular arm, the tubular appendage having an open section with adjacent longitudinal flanges which can be clamped against each other by means of a resilient clamping device.

5. An instrument panel according to claim 4, wherein the resilient clamping device comprises a screw which passes through the two longitudinal flanges of the tubular appendage, a nut screwed onto the screw, and resilient means interposed between the nut and the flange facing it.

6. An instrument panel according to claim 5, wherein the resilient means are constituted by a series of cup springs.

7. Instrument panel according to claim 4, wherein an ashtray is mounted on the tubular appendage.

8. An instrument panel according to claim 1, wherein the tubular arm is covered by a corrugated protective tube.

* * * * *